(12) United States Patent
Vidal et al.

(10) Patent No.: US 11,358,173 B2
(45) Date of Patent: Jun. 14, 2022

(54) METHOD FOR MANUFACTURING A TRANSPARENT VEHICLE PART

(71) Applicant: COMPAGNIE PLASTIC OMNIUM SE, Lyons (FR)

(72) Inventors: Sophie Vidal, Sainte-Julie (FR); Stéphane Guillier, Sainte-Julie (FR)

(73) Assignee: COMPAGNIE PLASTIC OMNIUM SE

( * ) Notice: Subject to any disclaimer, the term of this patent is extended or adjusted under 35 U.S.C. 154(b) by 0 days.

(21) Appl. No.: 16/985,257

(22) Filed: Aug. 5, 2020

(65) Prior Publication Data
US 2021/0039137 A1 Feb. 11, 2021

(30) Foreign Application Priority Data

Aug. 5, 2019 (FR) ...................................... 1908968

(51) Int. Cl.
*B05D 7/00* (2006.01)
*B05D 3/06* (2006.01)
*B60J 1/00* (2006.01)

(52) U.S. Cl.
CPC ............ *B05D 7/5883* (2013.01); *B05D 3/06* (2013.01); *B60J 1/00* (2013.01)

(58) Field of Classification Search
CPC .. B05D 7/56; B05D 7/57; B44C 1/228; B44F 1/06
See application file for complete search history.

(56) References Cited

U.S. PATENT DOCUMENTS

| | | | |
|---|---|---|---|
| 4,163,739 A | 8/1979 | Dalibor | |
| 5,104,682 A | 4/1992 | Nakahama et al. | |
| 6,277,312 B1* | 8/2001 | Hansen | B44C 1/228 |
| | | | 425/383 |
| 6,740,856 B1* | 5/2004 | Haag | C23C 16/047 |
| | | | 219/535 |
| 2003/0201182 A1 | 10/2003 | Nakamura et al. | |
| 2008/0038663 A1* | 2/2008 | Sugasaki | C08K 5/20 |
| | | | 430/270.1 |
| 2010/0209731 A1 | 8/2010 | Hamano | |
| 2010/0279043 A1* | 11/2010 | Hsu | C09D 133/08 |
| | | | 428/35.7 |
| 2011/0199728 A1* | 8/2011 | Reyes | G06F 1/1656 |
| | | | 361/679.31 |
| 2013/0215631 A1 | 8/2013 | Microllier et al. | |

(Continued)

FOREIGN PATENT DOCUMENTS

DE 4419197 A1 12/1994
DE 19702977 A1 7/1998
(Continued)

OTHER PUBLICATIONS

MP3 Car Stereo google search date limited prior to Aug. 5, 2018.*
Search Report Issued in French Patent Application No. 1908968, dated Apr. 22, 2020, 2 pages.

*Primary Examiner* — James M Mellott
(74) *Attorney, Agent, or Firm* — Dilworth IP, LLC

(57) ABSTRACT

In this method for manufacturing a vehicle part, the following steps are implemented, applying a first varnish coat to a transparent part, applying a paint coat to the first varnish coat, applying a second varnish coat to the paint coat, and irradiating the paint coat and the second varnish coat in part with laser radiation.

9 Claims, 1 Drawing Sheet

(56) References Cited

U.S. PATENT DOCUMENTS

2014/0177248 A1     6/2014  Oeuvrard et al.
2018/0371389 A1*   12/2018  Delrot .................. B29C 64/112

FOREIGN PATENT DOCUMENTS

| DE | 19715702 A1     | 10/1998 |
| DE | 102016214644 A1 | 2/2018  |
| EP | 0590194 A1      | 4/1994  |
| EP | 2006119 A2      | 12/2008 |
| EP | 3530476 A1      | 8/2019  |
| WO | 0139991 A1      | 6/2001  |
| WO | 2006025016 A1   | 3/2006  |

* cited by examiner

METHOD FOR MANUFACTURING A TRANSPARENT VEHICLE PART

FIELD OF THE INVENTION

The invention relates to a motor vehicle part. More particularly, the invention relates to a method for manufacturing a transparent vehicle part and contributing to the exterior appearance of the vehicle.

BACKGROUND OF THE INVENTION

A vehicle comprises a plurality of transparent parts that are intended to transmit light. In particular, these are parts used for regulatory lighting purposes, for example those protecting the optical units of high and low headlamps or turn signals. Furthermore, the vehicle may also have light sources that are provided for decorative purposes and improve the aesthetics of the vehicle.

For these purposes, it is possible to treat an external surface of the transparent parts in order to improve their appearance. One possibility for achieving this is to overmold a film on the external surface of the transparent part, the film having a predefined opaque pattern. In this way, when the light source that is associated with the transparent part emits light, the light is partially blocked by the opacity of the pattern and transmitted by the parts of the part that are not covered by the pattern. This improves the aesthetics of the light beam transmitted by the transparent part from the light source to the outside environment. Another possibility is to decorate the transparent part with paint and masking, which allows a similar result to be obtained.

These options are interesting but can be problematic. Indeed, a film such as that described above can cause problems of color mismatching with the paint of the vehicle, which has a negative impact on the aesthetics of the vehicle. In addition, applying the film in one of the ways presented above may not make it possible to obtain a pattern with as high a degree of precision as desired.

SUMMARY OF THE INVENTION

The object of the invention is in particular to remedy this problem by proposing a method that does not pose a problem of color mismatching with the paint of the vehicle and is more precise than that of the prior art.

To this end, a method for manufacturing a vehicle part is provided according to the invention which comprises the following steps:
  applying a first varnish coat to a transparent part,
  applying a paint coat to the first varnish coat,
  applying a second varnish coat to the paint coat, and
  irradiating the paint coat and the second varnish coat in part with laser radiation so as to etch the paint coat and the second varnish coat.

It is thus possible to apply the paint to the entire surface of the transparent part and then remove it by etching using laser radiation according to a predefined selected pattern. As will readily be understood, the laser makes it possible to remove the paint in order to obtain a more precise rendering than when implementing one of the methods of the prior art. In addition, the fact that the color of the coating is imparted by paint and not by a film as in the prior art makes it possible to select a paint that matches that used for the vehicle body. It follows that no problem of color mismatching arises.

The arrangement of the different coats and the order in which they are applied also makes it possible to overcome the following technical difficulties:
  if it is made of polycarbonate, the transparent part is impossible to treat in order to protect it from ultraviolet radiation, which makes the presence of at least one varnish coat necessary;
  irradiation of the vehicle part that would affect the transparent part is a source of defects for the paint coat and would adversely affect its appearance and its mechanical strength;
  it is very difficult to adhere a varnish coat directly to another varnish coat.

Advantageously, the transparent part is manufactured by molding a plastic such as polycarbonate, polypropylene, or poly(methyl methacrylate).

The transparent part is thus simple to produce and inexpensive.

Advantageously, the laser radiation has a wavelength within the infrared, preferably the near infrared.

Such laser radiation effectively eliminates the paint coat and the second varnish coat.

Advantageously, the first and second varnish coats are made of a material that absorbs or reflects ultraviolet radiation.

This protects the transparent part from ultraviolet radiation that might deteriorate it by photodegradation, since its entire outer surface is coated with the first varnish coat and, in part, with the second varnish coat.

Advantageously, the first and second varnish coats are transparent to any laser radiation having a wavelength within the near infrared.

The varnish coats can thus allow the laser radiation to pass without there being any risk of their being damaged by the laser radiation.

Advantageously, the first and second varnish coats are made of the same material.

Advantageously, the paint coat comprises a primer undercoat.

The primer undercoat makes it possible to opacify the paint coat and thus improve its appearance. Without a primer undercoat, it would be necessary to increase the thickness of the paint coat in order to obtain a similar rendering, which is preferable to avoid for reasons of appearance (sagging, color), cost, and adhesion of the paint coat to the transparent part. In addition, this improves the adhesion of the paint to the transparent part while making it possible for there to be a varnish coat in the regions without paint.

Advantageously, the vehicle part is polished after the irradiation step.

This improves the transparency of the vehicle part by limiting the edge effects of the irradiated regions. Specifically, the stepped shape of the layers coating the transparent part is reduced, which contributes to making its surface appearance more homogeneous. This also helps promote the transmission of the light beam through the vehicle part so as to maximize its illumination due to the absence of a so-called "magnifying glass" effect that the edge effects might cause.

According to the invention, a vehicle part is also provided which is obtained through implementation of a manufacturing method as defined above.

The manufacturing method improves the general quality of the vehicle parts produced in this way. Laser etching is carried out after the two passes in the "painting" portion of the production chain, the two passes corresponding to the application of the first varnish coat on the one hand and the application of the paint coat and the second varnish coat on the other hand. In this way, no dust produced by the etching is able to contaminate the application of the coats of varnish and paint. This helps to improve the quality of vehicle parts manufactured. In addition, the fact that etching is carried out after the passes in the "painting" portion of the production chain and not in an intermediate stage thereof makes it possible to streamline the manufacture of the vehicle part.

BRIEF DESCRIPTION OF THE FIGURES

The invention will be better understood upon reading the description which follows, given solely by way of example and with reference to the appended drawings in which.

DETAILED DESCRIPTION OF THE INVENTION

Figure 1:
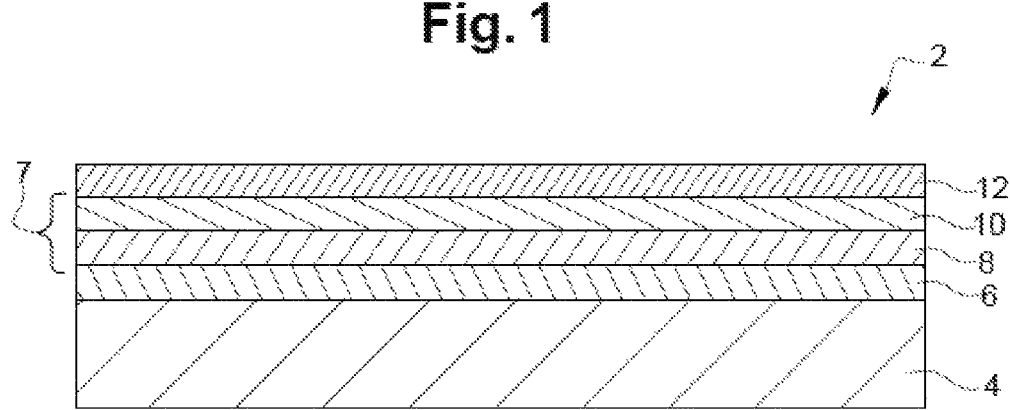
FIG. 1 is a sectional view of a first step in the implementation of a manufacturing method according to the invention.

FIG. 1 shows a first step of a method for manufacturing a vehicle part 2.

The vehicle part 2 comprises a transparent part 4 that is intended to protect a light source (not shown). The term "transparent" is understood to mean that it is at least transparent to any light radiation having a wavelength within the visible spectrum, i.e., between approximately 380 and 780 nm. The transparent part 4 is made here of a plastic having this characteristic—in this case polycarbonate, commonly called "PC." However, a provision can be made to produce the transparent part from any other plastic having this characteristic, such as polypropylene (PP) or poly (methyl methacrylate) (PMMA). The transparent part is produced by molding. Since such a method is known, we will not go into further detail about it in the following.

The vehicle part 2 comprises a first varnish coat 6 that is deposited onto an external surface of the transparent part 4. The term "external surface" is understood to mean a surface of the transparent part that is not situated opposite the light source and that is intended to be exposed to the external environment once the vehicle has been manufactured. The first varnish coat 6 protects the transparent part 4 from any ultraviolet radiation to which it may be exposed, particularly from the sun. In addition, the first varnish coat 6 makes it possible to mechanically protect the transparent part, particularly to prevent it from being scratched or deformed by external stresses.

The vehicle part 2 comprises a paint coat 7 that is deposited onto the external surface of the transparent part 4 on top of the first varnish coat 6. Here, the paint coat 7 comprises a primer undercoat 8 onto which a base coat 10 is deposited. The base coat 10 makes it possible to color the external appearance of the vehicle part 2. The primer undercoat 8 improves the opacity of the paint coat 7 and improves the adhesion of the base coat 10 to the transparent part 4.

The vehicle part 2 comprises a second varnish coat 12, which is deposited onto the external surface of the transparent part 4 on top of the paint coat 7. The second varnish coat 12 makes it possible to protect the transparent part 4 and the paint coat 7 from any ultraviolet radiation to which they may be exposed. Here, the first and second varnish coats are made of the same material, but a provision can be made to use two different varnishes to produce the two coats 6, 12.

According to the first step of the method for manufacturing the vehicle part 2, the first varnish coat 6, then the paint coat 7, and then the second varnish coat 12 is deposited onto the transparent part 4.

Figure 2:
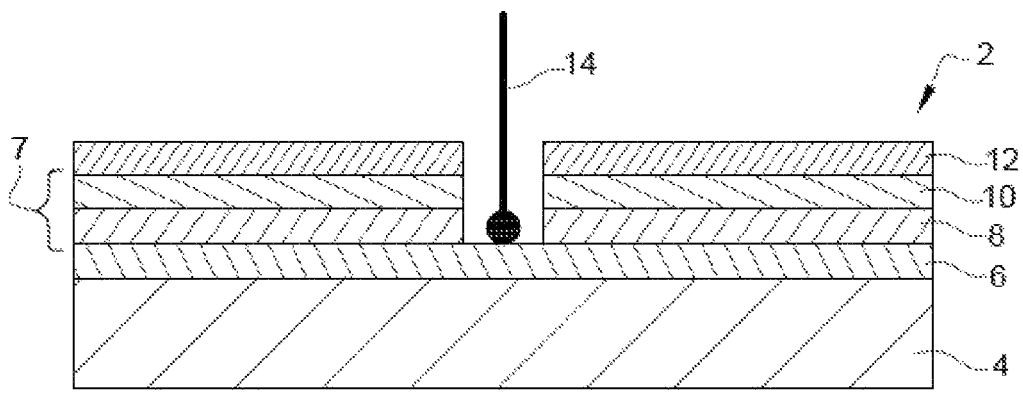
FIG. 2 is a sectional view of a second step in the implementation of a manufacturing method according to the invention.

FIG. 2 shows a second step of the method for manufacturing the vehicle part 2. In this step, a portion of the vehicle part 2 is irradiated using laser radiation 14 so as to etch the paint coat 7 and the second varnish coat 12. This etching is carried out throughout the thickness of the paint coat 7 and the second varnish coat 12. This operation is commonly referred to as "laser-etching." In the context of the invention, the laser radiation 14 has a wavelength in the infrared, i.e., between 700 nm and 20,000 nm. One example of such laser radiation is that commonly referred to as "$CO_2$ laser," which has a wavelength of 10,600 nm. Preferably, the wavelength of the laser radiation 14 is in the near infrared, i.e., between 700 and 2,000 nm. In this case—and if the first 6 and second 12 varnish coats are transparent to laser radiation 14—the latter range has the advantage of not etching the varnish coats. This avoids the risk of damaging the varnish coats.

The irradiation is carried out in only a portion of the vehicle part 2 in the sense that it is carried out according to a predefined pattern of the external surface of the second varnish coat 12. It is controlled in such a way that the second varnish coat 12 and the paint coat 7 are irradiated and hence eliminated in the pattern and throughout their thickness, but not the first varnish coat 6, which protects the transparent part from ultraviolet radiation in the regions of the pattern that have been etched. Even if the second varnish coat 12 is made of a material that is transparent to laser radiation 14, the irradiation of the underlying paint coat 7 makes it possible to eliminate the second varnish coat 12 in the pattern.

After irradiation, the surface of the vehicle part 2 has two levels.

In the region of the predefined pattern, the transparent part 4 is coated only with the first varnish coat 6. In this region, visible light can be transmitted from the light source to the outside environment, and vice versa.

Outside the region of the predefined pattern, the transparent part 4 is coated with the first varnish coat 6, the paint coat 7, and the second varnish coat 12. In this region, visible light cannot be transmitted from the external environment to the transparent part 4, and vice versa, because it is absorbed by the paint coat 7. In particular, the protection of the transparent part 4 from ultraviolet radiation to which it may be exposed is ensured by the second varnish coat 12.

After this irradiation step, an additional step of polishing the vehicle part 2 can be provided. This improves transparency in the region of the predefined pattern and, more generally, the aesthetics of the vehicle part 2. In addition, this polishing makes it possible to round the corners formed by the etching carried out during the irradiation step, and thus to improve the aesthetics of the vehicle part 2 and its tactile surface quality.

The invention is not limited to the embodiments described here, and other embodiments will become clearly apparent to a person skilled in the art.

The light source can be part of an optical block of low and high beams of the vehicle, of an optical block of turn signals of the vehicle, or of an optical block of decorative lights.

Alternatively, the transparent part can incorporate light guides or light sources without an optical unit through insert molding, overmolding, fixing by gluing, welding, riveting, or by any other fixing means.

LIST OF REFERENCES

2: vehicle part
4: transparent part

6: first varnish coat
7: paint coat
8: primer undercoat
10: base coat
12: second varnish coat
14: laser radiation

The invention claimed is:

1. A method for manufacturing a transparent external vehicle part, characterized in that it comprises the following successive steps:
   applying a first varnish coat, which is transparent to visible light, to a transparent part,
   applying a paint coat to the first varnish coat,
   applying a second varnish coat to the paint coat, and
   irradiating the paint coat and the second varnish coat in part with laser radiation so as to etch through the paint coat and the second varnish coat and expose a portion of the first varnish coat,
   wherein the first and second varnish coats are transparent to any laser radiation having a wavelength within the near infrared.

2. The method according to claim 1, wherein the transparent part is manufactured by molding a plastic.

3. The method according to claim 2, wherein the plastic is one of polycarbonate, polypropylene, or poly(methyl methacrylate).

4. The method according to claim 1, wherein the laser radiation has a wavelength within the infrared.

5. The method according to claim 1, wherein the laser radiation has a wavelength within the near infrared.

6. The method according to claim 1, wherein the first and second varnish coats are made of a material that is capable of absorbing or reflecting ultraviolet radiation.

7. The method according to claim 1, wherein the first and second varnish coats are made of a same material.

8. The method according to claim 1, wherein the paint coat comprises a primer undercoat.

9. The method according to claim 1, wherein the vehicle part is polished after the irradiation step.

* * * * *